T. S. MAXWELL.
DETACHABLE LINING FOR VEHICLE MUD GUARDS.
APPLICATION FILED MAY 16, 1916.
1,222,011.
Patented Apr. 10, 1917.
2 SHEETS—SHEET 1.
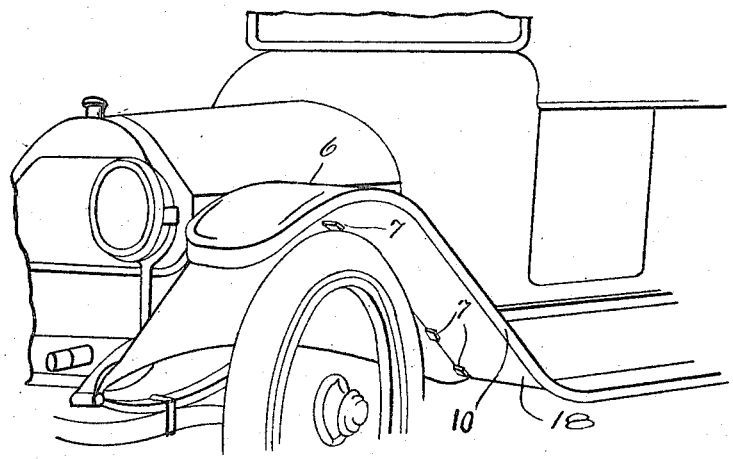
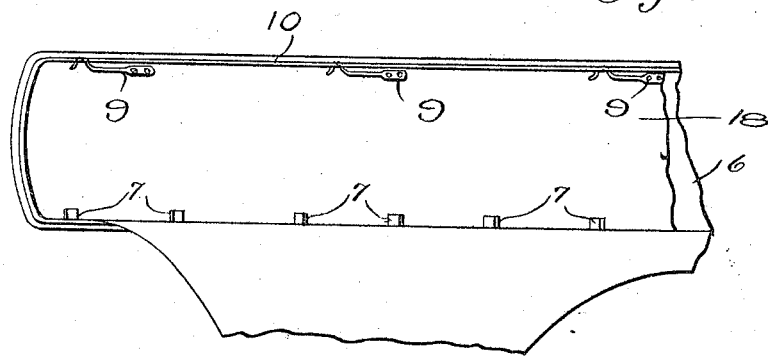
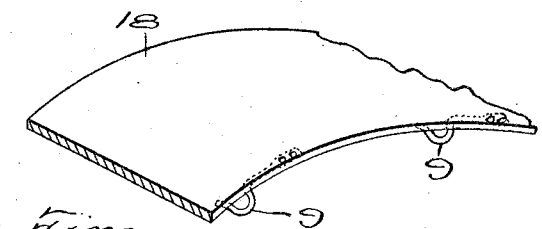
Inventor
T. S. Maxwell
By John A. Bernhardt
Attorney T. S. MAXWELL.
DETACHABLE LINING FOR VEHICLE MUD GUARDS.
APPLICATION FILED MAY 16, 1916.
1,222,011.
Patented Apr. 10, 1917.
2 SHEETS—SHEET 2.
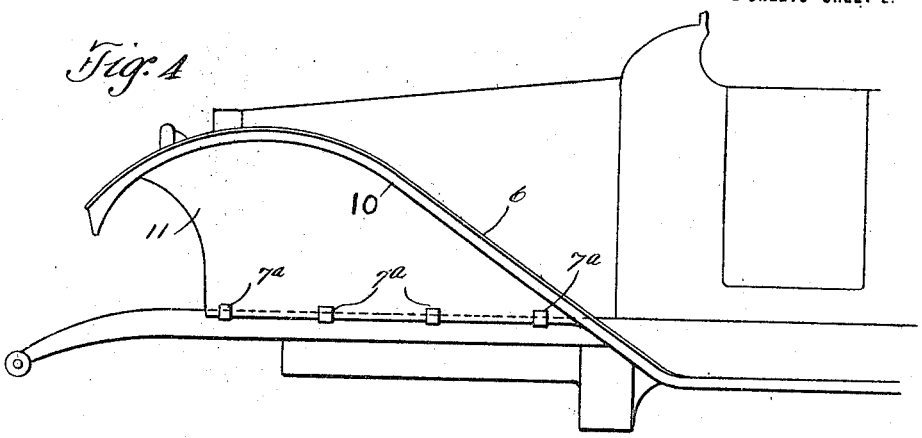
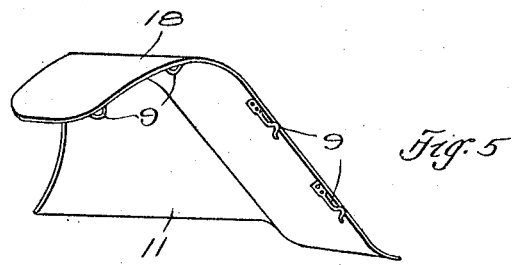
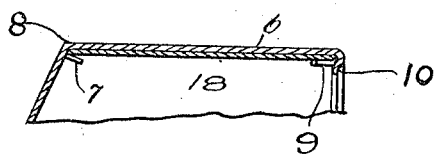
Inventor
T. S. Maxwell

UNITED STATES PATENT OFFICE.

THOMAS S. MAXWELL, OF CLEVELAND, OHIO.

DETACHABLE LINING FOR VEHICLE MUD-GUARDS.

1,222,011.  Specification of Letters Patent.  Patented Apr. 10, 1917.

Application filed May 16, 1916. Serial No. 97,943.

*To all whom it may concern:*

Be it known that I, THOMAS S. MAXWELL, citizen of the United States, residing at Cleveland, in the county of Cuyahoga and State of Ohio, have invented certain new and useful Improvements in Detachable Linings for Vehicle Mud-Guards, of which the following is a specification.

My invention relates to a detachable lining for vehicle mud guards by which the said lining is made to correspond in general shape to the under side of the mud guard, with an extension if desired, to extend downward from the inside edge of the said lining and attached thereto to cover any portion of the vehicle exposed to mud splashing under the mud guard proper, and with proper fasteners to hold said lining rigidly in place, permitting said lining to be quickly detached, cleaned and returned to position.

The object and advantage of my invention is mainly to easily and rapidly remove all mud or other accumulations from the under side of the mud guard of any vehicle. My invention is designed to cover all parts underneath the mud guard of a vehicle that may be exposed to splashes of muddy water or other accumulations; with a detachable lining, which can easily and quickly be removed and carried to any distance from the car, washed off and replaced, thus preventing muddy or dirty water falling upon the wheels or other parts of the vehicle, and by the use of my invention the mud and muddy water is deposited at any spot selected distant from the vehicle and is not underfoot, or under or about the vehicle. My invention also protects the finish on the under side of the mud guard.

The invention also has the advantage of being constructed to fit nearly, if not all, mud guards now in use, and by finishing the lining to correspond with the mud guard, the detachable lining causes no difference in the appearance in the mud guard.

This invention is applicable to vehicles of all kinds, irrespective of the propelling power, and the invention is not limited to the special form of lining shown and described herein, but various modifications may be made within the scope of the claims.

In the accompanying drawings I have shown two forms of the device.

Figure 1 is a perspective view of the front part of an automobile with the lining applied to the mud guard.

Fig. 2 is a detail in perspective of the under side of the mud guard.

Fig. 3 is a perspective view of a section of the lining.

Fig. 4 is a perspective view of a modification.

Fig. 5 is a perspective view of the lining shown in Fig. 4, having the drop extension.

Fig. 6 is a detail in section.

Referring specifically to the drawings, 6 indicates the mud guard of the vehicle, and this is provided along its inner end or edge with a plurality of downwardly and inwardly inclined lugs 7. These are conviently made to project at the edge of the flange 8 usually found on mud guards, and they are adapted to engage and hold the inner edge of the lining 18. This lining preferably consists of a plate of noncorrosive metal, finished on the under or exposed side to correspond with the finish of the mud guard, and of proper shape to fit up closely against the under side of the mud guard, and within or between the side flanges thereof. One edge of the lining, as stated, is held in position by the tongues or lugs 7. The other edge is held by spring catches 9 located on the outer or under edge of the lining, and attached thereto in any suitable manner. These catches may be made of wire, or flat spring metal, or otherwise, and are properly positioned or shaped to engage in a bead or groove indicated at 10, formed at the outer edge of the mud guard or produced in the flange 8 where it joins the mud guard plate. Instead of such a bead any suitable recess or projection may be provided for the engagement of the spring catches 9. The inclination of the tongues 7, and the pressure of the spring catches, tends to hold the lining in close contact against the under side of the mud guard, in which position it receives mud and splash thrown up by the wheels.

In the modification shown in Figs. 4 and 5, the same idea is carried out and adapted for use with a mud guard having a drop extension between the wheel and the body. For such mud guards, the lining is provided with a corresponding drop extension 11, and the extension on the mud guard has tongues 7ª at its lower end, similar to the tongues 7, and the edge of the extension 11 is set behind these tongues, the main plate 8 fitting up under the top plate of the mud guard, as above described, and the spring catches at the outer edge engaging in a similar manner.

In case of vehicles having mud guards which are not provided with the drop extension above referred to, and for the purpose of protecting that part of the vehicle body under the mud guard which is exposed to mud, I propose to construct a lining having a drop extension, the inner and lower edge of which will be held by tongues fastened to the lower sides of the car body, the tongues being arranged on a line to correspond with the contour of the inner and lower edge of the lining, the main plate 8 fitting up under the top plate of the mud guard, as hereinbefore described, and the spring catches at the outer edge engaging in a similar manner.

The number of tongues and catches provided will be sufficient for the purpose of holding the lining rigidly in place. Ordinarily one about every eight or twelve inches will be sufficient, however, with a catch as close as possible to each end of the lining.

To put the lining in position its inner edge is slipped in over the tongues 7, and the spring catches pressed back to permit the lining to be snapped up into position. To remove the lining, the spring fasteners are pressed back and the lining pulled down or out and removed. After being removed, it may be taken to any distant place and washed off, and then replaced, and this may be done without wetting the remainder of the vehicle.

What I claim as new is:

1. A detachable lining for a mud guard, having an upper portion shaped to conform to and covering the under side of the mud guard, and having at its inner edge a depending extension, and provided with means for detachably connecting the same to the mud guard.

2. The combination with a mud guard having angular projections at one edge, of a detachable lining adapted to fit the under surface of the mud guard, and engageable with said projections at one edge, and having catches at the opposite edge to engage the mud guard.

3. The combination with a mud guard having inclined tongues at one edge thereof, and recesses at the opposite edge, of a detachable lining for the mud guard, engageable with said tongues at one edge and having catches engageable in said recesses at the opposite edge.

4. The combination with a mud guard having means at one edge to engage a lining, of a lining engaged at one edge with said means, and having spring catches at the opposite edge engageable with said mud guard to hold the lining in position.

5. The combination with a mud guard having inclined projections at one edge and a depending flange at the opposite edge, of a removable lining adapted to fit the under side of said mud guard and engageable at one edge with said projections, and having spring fasteners at the other edge engageable with said flange.

In testimony whereof, I do affix my signature in presence of two witnesses.

THOMAS S. MAXWELL.

Witnesses:
JOHN A. BOMMHARDT,
G. W. ROSENBERG.